United States Patent
Sim et al.

(10) Patent No.: US 9,536,247 B2
(45) Date of Patent: Jan. 3, 2017

(54) SYSTEM AND METHOD FOR TRANSMITTING/RECEIVING DATA BY USING A MOBILE COMMUNICATION TERMINAL IN A ZIGBEE PAN

(75) Inventors: Dae-Hyun Sim, Seoul (KR); Kwang-Jun Kim, Seoul (KR); Jae-Ho Kim, Seoul (KR); Young-Seop Han, Suwon-si (KR); Yun-Chul Yi, Yongin-si (KR); Woo-Jun Choi, Suwon-si (KR); Beom-Soo Cho, Suwon-si (KR); Jeong-Eun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 13/584,238

(22) Filed: Aug. 13, 2012

(65) Prior Publication Data

US 2012/0309312 A1   Dec. 6, 2012

Related U.S. Application Data

(63) Continuation of application No. 12/124,482, filed on May 21, 2008, now Pat. No. 8,244,550.

(30) Foreign Application Priority Data

May 25, 2007   (KR) .................. 10-2007-0051057

(51) Int. Cl.
*G06Q 30/02* (2012.01)
*H04W 84/18* (2009.01)

(52) U.S. Cl.
CPC .............. *G06Q 30/02* (2013.01); *H04W 84/18* (2013.01)

(58) Field of Classification Search
CPC ..... G06K 19/0723; G06F 21/31; H04W 84/18
(Continued)

(56) References Cited

U.S. PATENT DOCUMENTS 6,008,727 A * 12/1999 Want .................... G06K 7/0008
340/10.42
6,176,425 B1 * 1/2001 Harrison .............. G06K 7/0008
235/383

(Continued)

FOREIGN PATENT DOCUMENTS

EP          1 253 540 A2    10/2002
KR     10-2006-0068518 A     6/2006

(Continued)

OTHER PUBLICATIONS

Baronti et al., XP 022024796, "Wireless sensor networks: A survey on the state of the art and the 802.15.4 and ZigBee standards", vol. 30.No. 7, p. 1655-1695, Dec. 29, 2006.

*Primary Examiner* — Hai V Nguyen
(74) *Attorney, Agent, or Firm* — Jefferson IP Law, LLP

(57) ABSTRACT

A mobile communication terminal, a method for transmitting/receiving data by a mobile communication terminal in a communication system, and a communication system comprising at least one mobile communication terminal are provided. The terminal includes a communication module for performing short-distance communication, a context engine for extracting a tag from contents data, and a controller for generating the contents data, generating profile information using the tag, and controlling the communication module to broadcast the profile data and the contents data.

15 Claims, 9 Drawing Sheets

(58) Field of Classification Search
USPC .......................................... 455/41.1; 726/19
See application file for complete search history.

(56) References Cited

U.S. PATENT DOCUMENTS

| | | | | |
|---|---|---|---|---|
| 6,249,226 | B1* | 6/2001 | Harrison | G06K 7/0008 340/10.6 |
| 6,340,931 | B1* | 1/2002 | Harrison | G06K 7/0008 235/385 |
| 6,342,830 | B1* | 1/2002 | Want | G06K 7/0008 307/91 |
| 6,446,208 | B1* | 9/2002 | Gujar | G06K 7/0008 713/184 |
| 6,456,234 | B1 | 9/2002 | Johnson | |
| 6,487,390 | B1* | 11/2002 | Virine | G09F 27/00 455/3.01 |
| 6,604,085 | B1* | 8/2003 | Kolls | G06Q 10/10 705/14.23 |
| 6,664,891 | B2* | 12/2003 | Davies | H04B 1/713 340/10.1 |
| 6,968,178 | B2* | 11/2005 | Pradhan | G06Q 30/02 455/406 |
| 7,065,575 | B1* | 6/2006 | Machiraju | H04W 92/02 709/212 |
| 7,310,734 | B2* | 12/2007 | Boate | H04L 63/0853 380/270 |
| 7,319,912 | B2* | 1/2008 | Park | G05B 19/4183 340/572.1 |
| 7,483,964 | B1* | 1/2009 | Jackson | H04L 12/2809 455/41.1 |
| 7,522,058 | B1* | 4/2009 | Light | G06Q 10/10 340/539.1 |
| 7,580,528 | B2* | 8/2009 | Farley | H04B 7/18502 380/270 |
| 7,653,302 | B2* | 1/2010 | Limberis | G06F 17/30038 396/310 |
| 7,796,945 | B2* | 9/2010 | Abbate | H04W 8/005 370/310 |
| 7,797,204 | B2* | 9/2010 | Balent | G06Q 10/087 705/26.8 |
| 7,853,622 | B1* | 12/2010 | Baluja | G06F 17/30035 707/713 |
| 8,023,929 | B2* | 9/2011 | Mgrdechian | G06Q 30/0207 455/414.1 |
| 8,126,147 | B2* | 2/2012 | Farley | H04B 7/18502 380/210 |
| 8,145,679 | B1* | 3/2012 | Baluja | G06F 17/30035 707/713 |
| 8,149,849 | B2* | 4/2012 | Osborn | H04L 12/2834 370/401 |
| 8,150,416 | B2* | 4/2012 | Ribaudo | G01S 5/0018 370/338 |
| 8,165,070 | B2* | 4/2012 | Salminen | H04L 63/08 370/328 |
| 8,180,296 | B2* | 5/2012 | Flaherty | G06F 3/016 455/41.2 |
| 8,239,418 | B1* | 8/2012 | Baluja | G06F 17/30035 707/713 |
| 8,244,550 | B2* | 8/2012 | Sim | G06Q 30/02 705/1.1 |
| 8,260,315 | B2* | 9/2012 | Fortescu | G06Q 30/02 455/456.1 |
| 8,533,236 | B1* | 9/2013 | Baluja | G06F 17/30035 707/802 |
| 8,565,676 | B2* | 10/2013 | Gormley | H04B 5/0012 455/214 |
| 8,601,127 | B2* | 12/2013 | Lim | H04L 12/2805 709/203 |
| 8,618,956 | B2* | 12/2013 | Bragagnini | G07B 15/063 340/988 |
| 8,626,237 | B2* | 1/2014 | Boyaci | H04M 1/6066 455/41.2 |
| 8,639,687 | B2* | 1/2014 | Lee | G06F 17/30702 707/723 |
| 8,676,587 | B1* | 3/2014 | Gazdzinski | G06Q 30/0251 342/357.22 |
| 8,688,141 | B2* | 4/2014 | Ribaudo | G01S 5/0018 455/403 |
| 8,918,050 | B2* | 12/2014 | Gormley | H04B 5/0012 455/41.1 |
| 8,989,661 | B2* | 3/2015 | Hillyard | G10L 19/0019 455/41.2 |
| 9,177,294 | B2* | 11/2015 | Chijiiwa | G06Q 10/107 |
| 2001/0055950 | A1* | 12/2001 | Davies | H04B 1/713 455/41.2 |
| 2002/0160793 | A1* | 10/2002 | Pradhan | G06Q 30/02 455/466 |
| 2002/0174110 | A1* | 11/2002 | Smith | G06F 17/30905 |
| 2003/0004884 | A1* | 1/2003 | Kitazato | G06Q 30/02 705/51 |
| 2003/0093806 | A1* | 5/2003 | Dureau | H04N 7/088 725/107 |
| 2005/0148329 | A1* | 7/2005 | Brunet | H04W 8/245 455/432.2 |
| 2006/0123053 | A1 | 6/2006 | Scannell, Jr. | |
| 2006/0149905 | A1* | 7/2006 | Park | H04L 67/12 711/141 |
| 2006/0154598 | A1* | 7/2006 | Rudland | H04L 12/185 455/3.01 |
| 2006/0224693 | A1* | 10/2006 | Gaidemak | G06Q 30/02 709/217 |
| 2006/0288010 | A1* | 12/2006 | Chen | G06F 21/41 |
| 2007/0202881 | A1* | 8/2007 | Dervan | G06Q 30/02 455/450 |
| 2007/0281614 | A1* | 12/2007 | Oliver | H04B 1/3805 455/41.2 |
| 2007/0282959 | A1* | 12/2007 | Stern | G06Q 30/02 709/206 |
| 2008/0022329 | A1* | 1/2008 | Glad | G06Q 10/101 725/86 |
| 2008/0066097 | A1* | 3/2008 | Park | H04N 21/235 725/32 |
| 2008/0140476 | A1* | 6/2008 | Anand | G06Q 30/02 705/14.43 |
| 2008/0140508 | A1* | 6/2008 | Anand | G06Q 30/02 705/14.43 |
| 2008/0140524 | A1* | 6/2008 | Anand | G06Q 30/02 705/14.66 |
| 2008/0140525 | A1* | 6/2008 | Lamsfuss | G06Q 30/02 705/14.54 |
| 2008/0183828 | A1* | 7/2008 | Sehgal | H04W 4/02 709/206 |
| 2008/0208826 | A1* | 8/2008 | Kramer | G06F 17/30864 |
| 2008/0216171 | A1* | 9/2008 | Sano | H04L 9/32 726/19 |
| 2008/0235237 | A1* | 9/2008 | Williams | A63F 13/10 |
| 2008/0255944 | A1* | 10/2008 | Shah | G06Q 30/02 705/14.47 |
| 2008/0291854 | A1* | 11/2008 | Sim | G06Q 30/02 370/310 |
| 2008/0298313 | A1* | 12/2008 | Salminen | H04L 63/08 370/329 |
| 2008/0318602 | A1* | 12/2008 | Chang | G06F 3/1204 455/466 |
| 2009/0019033 | A1* | 1/2009 | Lee | G06F 17/30702 |
| 2009/0019061 | A1* | 1/2009 | Scannell, Jr. | G06F 17/30905 |
| 2009/0036055 | A1* | 2/2009 | Choi | H04W 48/18 455/41.2 |
| 2009/0046152 | A1* | 2/2009 | Aman | A63B 24/0021 348/157 |
| 2009/0059919 | A1* | 3/2009 | Kim | H04W 48/12 370/389 |
| 2009/0082062 | A1* | 3/2009 | Boyaci | H04M 1/6066 455/557 |
| 2009/0132581 | A1* | 5/2009 | Ahlberg | G06F 17/30551 |
| 2009/0203317 | A1* | 8/2009 | Waung | G06Q 10/00 455/41.2 |

(56) References Cited

U.S. PATENT DOCUMENTS

| | | | |
|---|---|---|---|
| 2009/0210532 A1* | 8/2009 | Lim | H04L 12/2805 709/226 |
| 2009/0240912 A1* | 9/2009 | Wakrat | G06F 12/0646 711/173 |
| 2009/0288012 A1* | 11/2009 | Hertel | G06Q 20/02 715/738 |
| 2010/0203834 A1* | 8/2010 | Bragagnini | G07B 15/063 455/41.2 |
| 2011/0145049 A1* | 6/2011 | Hertel | G06Q 20/02 705/14.23 |
| 2012/0309312 A1* | 12/2012 | Sim | G06Q 30/02 455/41.1 |
| 2014/0095293 A1* | 4/2014 | Abhyanker | H04L 67/18 705/14.41 |
| 2014/0229274 A1* | 8/2014 | Abhyanker | G06Q 30/0261 705/14.46 |
| 2014/0230025 A1* | 8/2014 | Abhyanker | G06Q 10/087 726/4 |
| 2014/0236542 A1* | 8/2014 | Abhyanker | G06Q 10/087 703/1 |
| 2014/0236644 A1* | 8/2014 | Abhyanker | G06Q 10/087 705/5 |
| 2014/0236723 A1* | 8/2014 | Abhyanker | G06Q 10/087 705/14.57 |
| 2014/0244859 A1* | 8/2014 | Jannink | H04L 65/60 709/231 |

FOREIGN PATENT DOCUMENTS

| | | |
|---|---|---|
| KR | 10-2006-0121826 A | 11/2006 |
| KR | 10-2007-0006505 | 1/2007 |
| KR | 10-2007-0013102 A | 1/2007 |

\* cited by examiner

SYSTEM AND METHOD FOR TRANSMITTING/RECEIVING DATA BY USING A MOBILE COMMUNICATION TERMINAL IN A ZIGBEE PAN

CROSS-REFERENCE TO RELATED APPLICATIONS

This application is a continuation of U.S. patent application Ser. No. 12/124,482 that was filed on May 21, 2008 and issued as U.S. Pat. No. 8,244,550 on Aug. 14, 2012, and claims the benefit under 35 U.S.C. §119(a) of a Korean patent application filed in the Korean Intellectual Property Office on May 25, 2007 and assigned Serial No. 10-2007-0051057, the entire disclosure of each of which is hereby incorporated by reference.

BACKGROUND OF THE INVENTION

1. Field of the Invention

The present invention relates to an apparatus and a method for transmitting/receiving data in a communication system of a Zigbee Personal Area Network (PAN). More particularly, the present invention relates to a mobile communication terminal equipped with a Zigbee communication module for transmitting/receiving contents data in a Zigbee PAN and a method for transmitting/receiving data in a communication system of the Zigbee PAN.

2. Description of the Related Art

A Wireless Personal Area Network (WPAN) corresponds to a concept of wirelessly realizing an existing PAN. The PAN corresponds to a concept which contrasts with a widely known Local Area Network (LAN) or Wide Area Network (WAN), and means that every individual has their own unique network. More specifically, devices owned by a single person are allowed to construct a single network for the sake of convenience of each person.

In an effort to implement the WPAN, the IEEE 802.15 working group has established WPAN as a standard for short distance wireless networks, and has implemented four Task Groups (TGs) to administrate the standard. IEEE 802.15.1 corresponds to the well-known Bluetooth protocol, IEEE 802.15.3 and IEEE 802.15.3a correspond to a high rate WPAN, and IEEE 802.15.4, also known as "Zigbee," performs a standard job on a low rate WPAN below 205 kbps.

In prior communication and broadcasting systems, collected data has been stored in each server. Accordingly, a process for gaining access to a server has required for usage of the data when a user uses the data. More specifically, a prior communication scheme includes the generating and delivering of the data in a form of production, management, and transmission/reception (Tx/Rx) in a centralized manner. Also, based on a transmission/reception (Tx/Rx) form of data when using WPAN, its main purpose is the connectivity to a headset, a peripheral device, a Personal Computer (PC), and the like. Accordingly, a user can obtain the access to data only if the user uses a peripheral device or a PC which performs the role of a server.

However, there are restraints on the Tx/Rx of User Created Contents (UCC) that are necessary in a specific space due to handling of information data in a centralized manner. Therefore, there is a need for an apparatus and method for data transmission/reception, by which a user can optionally edit UCC, such as an advertisement, guidance, multimedia contents, a text message, etc., and then transfer the UCC to another user existing in a particular space, or a user can acquire only necessary information in a particular space.

SUMMARY OF THE INVENTION

An aspect of the present invention is to address the above-stated problems and/or disadvantages and to provide at least the advantages described below. Accordingly, an aspect of the present invention is to provide a mobile communication terminal for transmitting/receiving data and a method for transmitting/receiving data by a mobile communication terminal in a communication system by extracting a tag from contents data and generating a profile using the tag.

In accordance with an aspect of the present invention, a mobile communication terminal is provided. The mobile communication terminal includes a communication module for performing short-distance communication, a context engine for extracting a tag from contents data, and a controller for generating the contents data, generating profile information using the tag, and controlling the communication module to broadcast the profile data and the contents data.

In accordance with another aspect of the present invention, a method for transmitting/receiving data of a mobile communication terminal is provided. The method includes generating contents data, extracting a tag from the contents data and generating profile information based on the extracted tag, and broadcasting the contents data and the profile information.

In accordance with yet another aspect of the present invention a communication system including at least one mobile communication terminal is provided. The communication system includes a first terminal for generating contents data, for extracting a tag from the contents data, for generating profile information using the tag, and for broadcasting the profile information and the contents data, and a second terminal for receiving the profile information from the first terminal, for extracting the tag from the profile information, for determining whether the tag and previously stored tag coincide with each other or not, and for receiving the contents data corresponding to the tag if the tag and previously stored tag coincide with each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Figure 1:
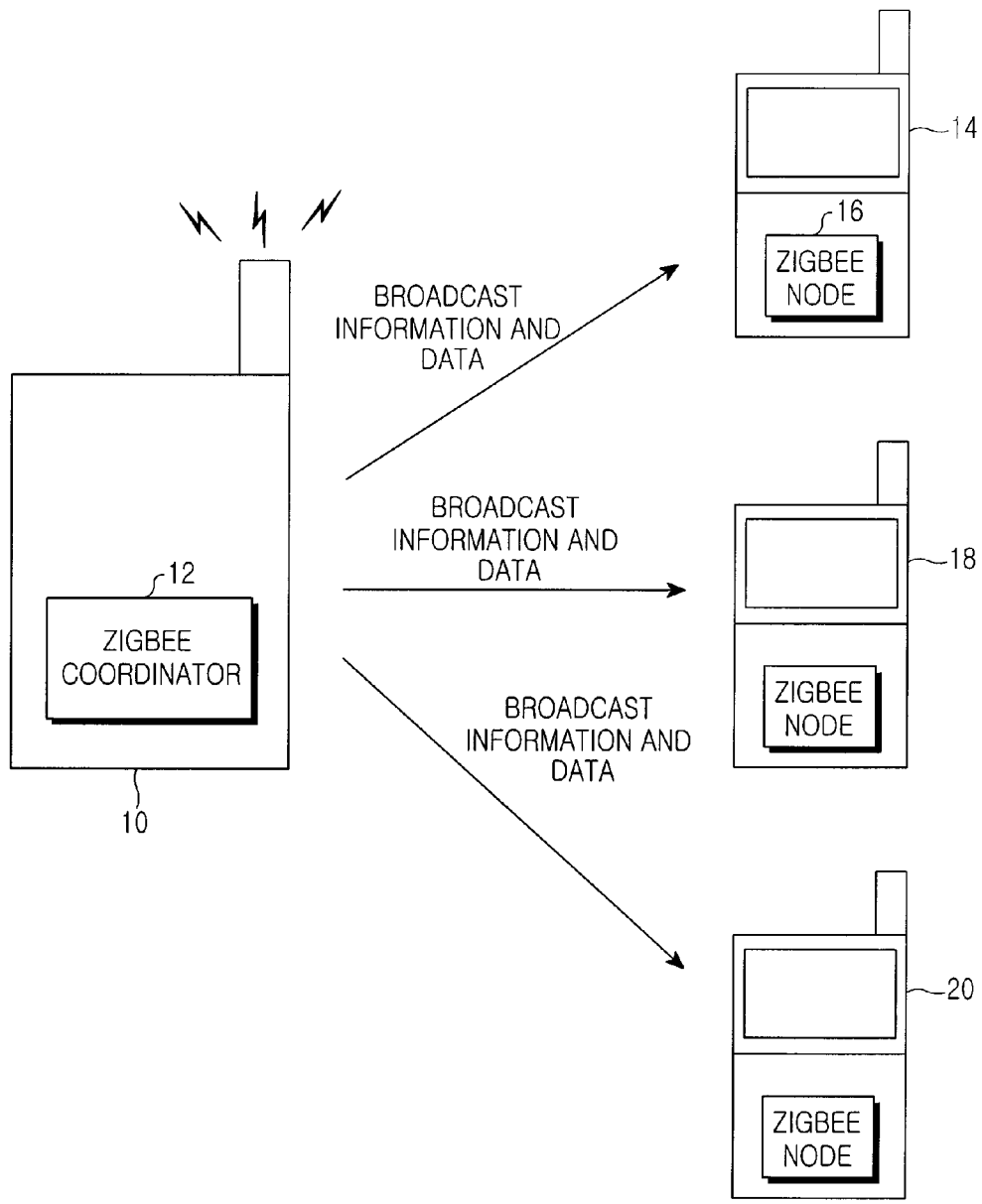
FIG. 1 is a view illustrating a system for transmitting/receiving data among mobile communication terminals, each of which includes a Zigbee communication module according to an exemplary embodiment of the present invention.

FIG. 1 is a view illustrating a system for transmitting/receiving data among mobile communication terminals, each of which includes a Zigbee communication module according to an exemplary embodiment of the present invention.

Referring to FIG. 1, four mobile communication terminals, each of which is equipped with a Zigbee communication module, are depicted as an exemplary implementation. Among the four mobile communication terminals, a first terminal 10 includes a Zigbee communication module which performs a role of a Zigbee coordinator 12. The Zigbee coordinator 12 broadcasts contents data in a Personal Area Network (PAN) of the first terminal 10.

The first terminal 10 can construct a PAN, which is a Local Area Network (LAN), and can then transfer or broadcast data to the other devices located in the PAN of the first terminal 10.

Each of the first terminal 10, a second terminal 14, a third terminal 18, and a fourth terminal 20 can include a Zigbee communication module which performs a role of a Zigbee node 16. Hence, the second terminal 14, the third terminal 18, and the fourth terminal 20 receive contents data broadcasted from the Zigbee coordinator 12 of the first terminal 10 through the respective Zigbee nodes.

Figure 2:
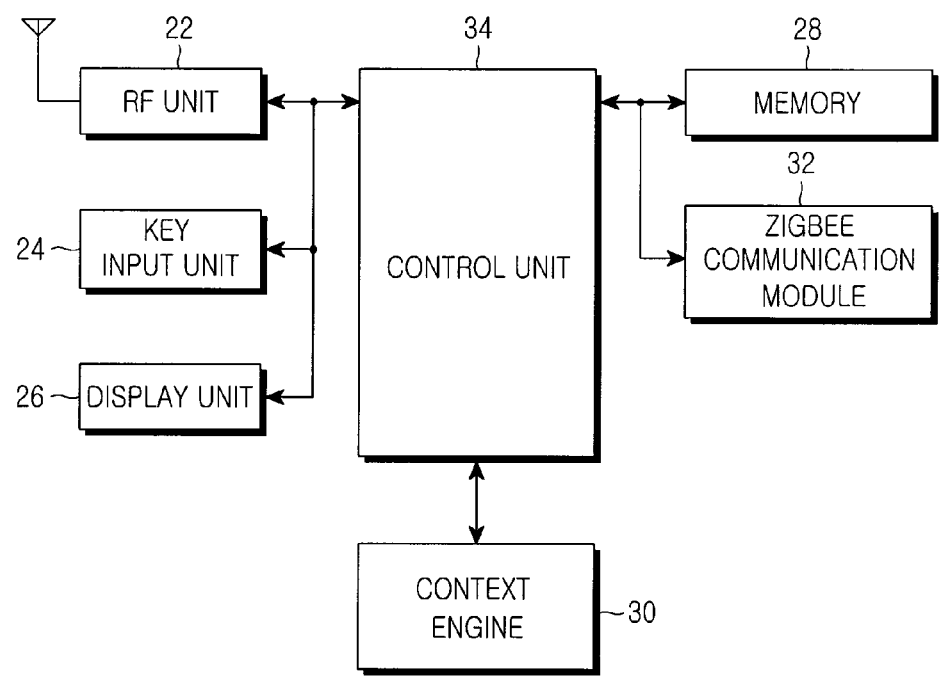
FIG. 2 is a block diagram illustrating a schematic configuration of a mobile communication terminal including a Zigbee communication module according to an exemplary embodiment of the present invention.

FIG. 2 is a block diagram illustrating a schematic configuration of a mobile communication terminal including a Zigbee communication module according to an exemplary embodiment of the present invention.

The mobile communication terminal according to an exemplary embodiment of the present invention includes a Radio Frequency (RF) unit 22, a key input unit 24, a display unit 26, a memory 28, a context engine 30, a Zigbee communication module 32, and a control unit 34.

The RF unit 22 performs a wireless communication function of the mobile communication terminal, and can implement the wireless communication function performed in the mobile communication terminal, except for a communication function that the Zigbee communication module 32 performs. The RF unit 22 includes an RF transmitter (not illustrated) for upconverting a frequency of a transmitted signal and for amplifying the power thereof, and an RF receiver (not shown) for performing low noise amplification of a received signal and downconverting the frequency thereof.

The key input unit 24 includes keys for receiving inputs of numerals and characters and keys for setting various types of functions. The key input unit 24 receives an input from a user. As an example, the key input unit 24 according to the exemplary embodiment of the present invention can receive a user input for generating contents data. The user can input characters or numerals expressing the contents of contents data. Also, the user may previously input a dispatch time point for contents data and the like to allow them to be stored, and can then reserve broadcasting of contents data until the dispatch time.

In an exemplary implementation, the user may input the words "blue jeans, discount, 20%" through the key input unit 24, and then may generate contents data with the contents "discounting Levi's blue jeans at 20%." Also, if the user inputs the words "a dispatch time point: 1 p.m. to 2 p.m., at an interval of five minutes", by the control of the control unit 34, a mobile communication terminal can transfer the contents data in the PAN at an interval of five minutes from 1 p.m. to 2 p.m.

The display unit 26 can be implemented by using a Liquid Crystal Display (LCD), and outputs various types of display data generated by the mobile communication terminal 10. If the display unit 26 is implemented by using the LCD in a scheme of touch screen, the display unit 26 operates as an input means.

If the user inputs characters or numerals through the key input unit 24 so as to generate contents data in the display unit 26 according to an exemplary embodiment of the present invention, the input characters or numerals can be displayed. In addition, if contents data is received from the other mobile communication terminals, the received contents data can be displayed.

The memory 28 includes a program memory and a data memory. In the memory 28, various pieces of information required to control an operation of a mobile communication terminal are stored. In the memory 28 according to an exemplary embodiment of the present invention, a tag which is input by a user through the key input unit 24 can be stored. Also, the control unit 34 can control the memory 28 to store contents data and log data.

The Zigbee communication module 32 corresponds to a communication module for performing Zigbee communications. The mobile communication terminal according to an exemplary embodiment of the present invention is equipped with the Zigbee communication module 32 using Zigbee communication module 32, the mobile communication terminal can perform a role of the Zigbee coordinator or the Zigbee node in Zigbee communications. The Zigbee communication module 32 forms a PAN corresponding to a LAN, and can then forward contents data to the PAN.

The mobile communication terminal which performs a role of the Zigbee coordinator forms a PAN, and then broadcasts contents data in the PAN. The mobile communication terminal which performs a role of the Zigbee node enters the PAN that the mobile communication terminal which performs a role of the Zigbee coordinator has formed, and then receives broadcasted contents data.

Hereinafter, a mobile communication terminal which performs a role of the Zigbee coordinator is referred to as a 'first terminal' and another mobile communication terminal which performs a role of the Zigbee node is referred to as a 'second terminal.'

The context engine 30 extracts a tag from contents data. The tag corresponds to at least one character that can be representative of the essential contents of the contents data. The context engine 30 extracts at least one character required to enable detecting of the context from the contents data, and then extracts the tag.

In an exemplary implementation of a tag, if contents data corresponds to "The ABC store is discounting blue jeans at 30%.", the context engine 30 can extract, as tags, the words "blue jeans" and "discount" from the contents data.

The control unit 34 controls overall operations of the mobile communication terminal. The control unit 34 according an exemplary embodiment of the present invention receives user input entered through the key input unit 24, and then generates contents data. Also, based on the generated contents data, the control unit 34 controls the context engine 30 to extract the tag, and then generates profile information on the basis of the extracted tag. The generated profile information includes at least one tag included in the contents data, and enables perceiving what information the contents data includes.

For instance, if contents data corresponds to a blue jeans discount coupon, a tag can correspond to "blue jeans", "discount", and the like, and profile information can correspond to data necessary to give notice that the contents data is information about the blue jeans discount coupon. More specifically, the profile information corresponds to information required to give notice that tags, such as "blue jeans" and "discount", are included in the contents data.

Under the control of the control unit 34, the Zigbee communication module 32 is enabled to act as a Zigbee coordinator of the first terminal. The first terminal forms a PAN and broadcasts contents data in the PAN. Also, in the case of the second terminal 14, a control unit controls a Zigbee communication module 32 of the second terminal 14 to function as a Zigbee node of the first terminal 10, and then controls the second terminal 14 to enable receiving the contents data broadcasted in the PAN of the first terminal 10.

Figure 3:
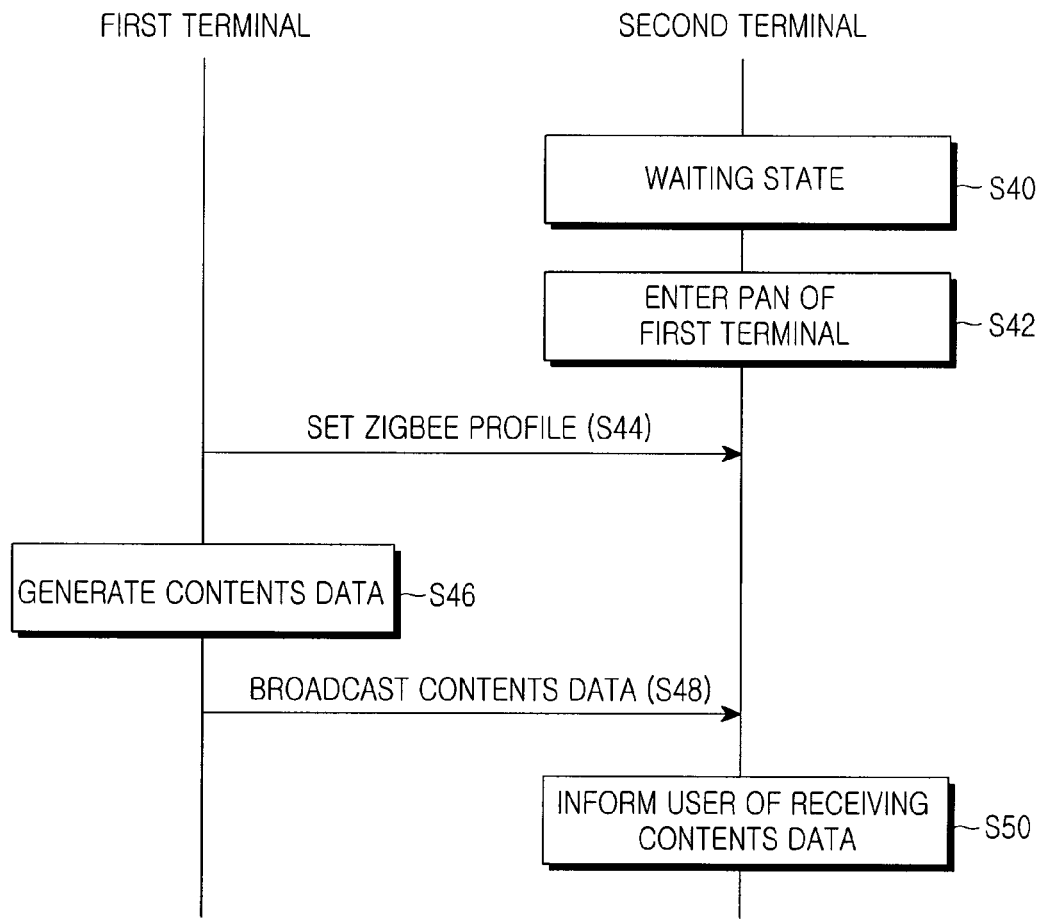
FIG. 3 is a flowchart illustrating a method for transmitting/receiving data between a first terminal and a second terminal, each of which includes a Zigbee communication module according to an exemplary embodiment of the present invention.

FIG. 3 is a flowchart illustrating a method for transmitting/receiving data between a first terminal and a second terminal, each of which includes a Zigbee communication module according to an exemplary embodiment of the present invention.

Referring to FIG. 3, the second terminal 14 equipped with the Zigbee communication module 32 enters the PAN of the first terminal 10 in step S42 from a waiting state in step S40. If the second terminal 14 enters the PAN of the first terminal 10, the first terminal 10 sets a Zigbee profile in step S44.

The Zigbee profile can refer to setting data including information on a communication scheme, etc., such as a protocol, etc., which has been set so that the first terminal 10 may transmit/receive data in the PAN thereof. With setting of the Zigbee profile, the second terminal 14 can perform the role of the Zigbee node in the PAN of the first terminal 10.

The first terminal 10 generates contents data in step S46. The generation of the contents data can be implemented upon receiving an input from a user of the first terminal 10. If the first terminal 10 broadcasts the contents data in the PAN thereof in step S48, the second terminal 14 receives the contents data. Also, the second terminal 14 enables the display unit 26 to display the contents data, and then informs the user of receiving the contents data in step S50.

Figure 4:
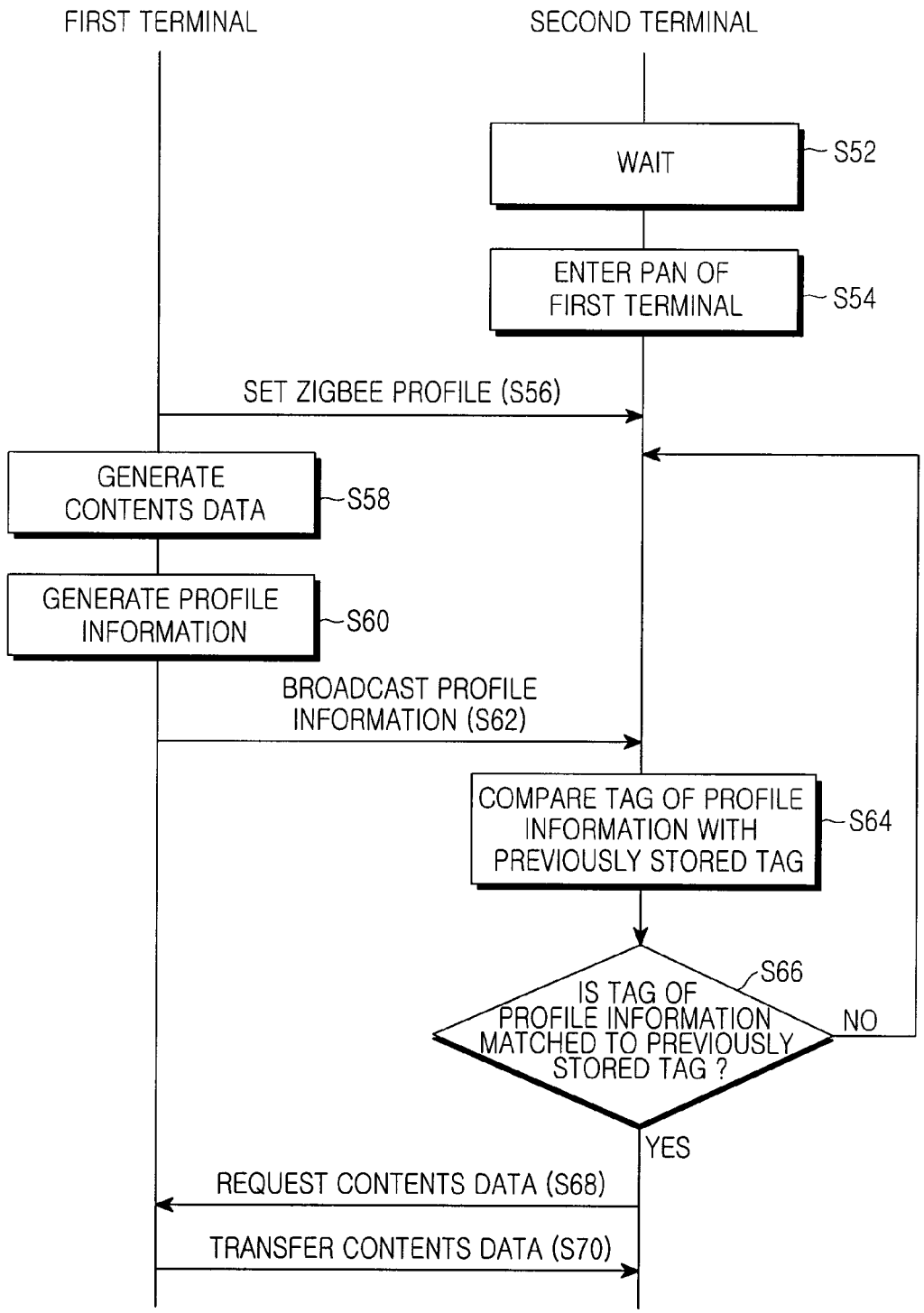
FIG. 4 is a flowchart illustrating a method for transmitting/receiving data between a first terminal and a second terminal, each of which includes a Zigbee communication module according to another exemplary embodiment of the present invention.

FIG. 4 is a flowchart illustrating a method for transmitting/receiving data between a first terminal and a second terminal, each of which includes a Zigbee communication module according to another exemplary embodiment of the present invention.

Referring to FIG. 4, the second terminal 14 equipped with the Zigbee communication module 32 enters a PAN of the first terminal 10 in step S54 from a waiting state in step S52. If the second terminal 14 enters the PAN of the first terminal 10, the first terminal 10 sets a Zigbee profile in step S56.

The first terminal 10 generates contents data upon receiving an input, etc., from a user in step S58. The first terminal 10 extracts a tag from the contents data generated in step S58, and then generates profile information in step S60. The tags can be characters or images that are representative of the contents data. Also, the profile information corresponds to data including at least one tag, and is data necessary to give notice of what information the contents data includes.

The first terminal 10 broadcasts the profile information generated in step S60 in the PAN of the first terminal 10 in step S62. The second terminal 14 receives the profile information broadcasted in the PAN of the first terminal 10, and then compares a tag included in the received profile with a previously stored tag in step S64. At this time, the previously stored tag can be at least one tag that has already been stored in a memory 28 of the second terminal 14 upon receiving a user input.

According to a comparative result, the first terminal 10 determines if the tag included in the received profile coincides with the previously stored tag in step S66. If the tag included in the received profile coincides with the previously stored tag, the second terminal 14 requests the first terminal 10 to transfer contents data in step S68, and the first terminal 10 transfers the contents data to the second terminal 14 in step S70. In contrast, if the tag included in the received profile does not coincide with the previously stored tag, the second terminal 14 does not receive the contents data from the first terminal 10, but completes an operation thereof.

Figure 5:
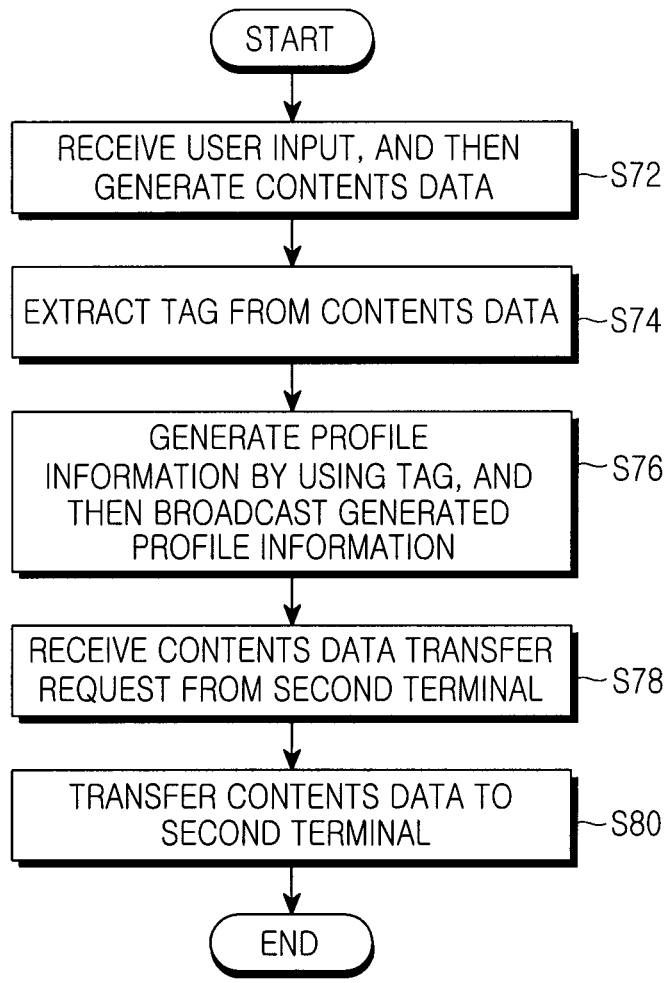
FIG. 5 is a flowchart illustrating a method for transmitting/receiving data by a first terminal among mobile communication terminals, each of which includes a Zigbee communication module according to an exemplary embodiment of the present invention.

FIG. 5 is a flowchart illustrating a method for transmitting/receiving data by a first terminal among mobile communication terminals, each of which includes a Zigbee communication module according to an exemplary embodiment of the present invention.

Referring to FIG. 5, the first terminal 10 including the Zigbee communication module 32 receives an input from a user, and then generates contents data in step S72. In an exemplary embodiment, the first terminal 10 may display a User Interface (UI) for the user input for generating contents data through the display unit 26. The user can input characters, etc., required to generate contents data through the key input unit 24. Moreover, so as to generate the contents data, the user can utilize images that have already been stored in the memory 28 of the first terminal 10.

If contents data is generated in step S72, the first terminal 10 extracts a tag from the generated contents data in step S74. The first terminal 10 generates profile information by using the extracted tag, and then broadcasts the generated profile information in the PAN of the first terminal 10 in step S76. If the first terminal 10 receives a contents data transfer request from the second terminal 14 that enters the PAN of the first terminal 10 in step S78, the first terminal 10 transfers the generated contents data generated in step S72 to second terminal 14 in step S80.

While a description is limitedly made of a situation where the first terminal 10 receives a request for transferring contents data from the second terminal 14 according to an exemplary implementation, a first terminal 10 may transfer contents data in a form of broadcasting without a request for transferring contents data from the second terminal 14. In addition, the first terminal 10 may broadcast profile information and the contents data by periods previously set in a PAN.

Figure 6:
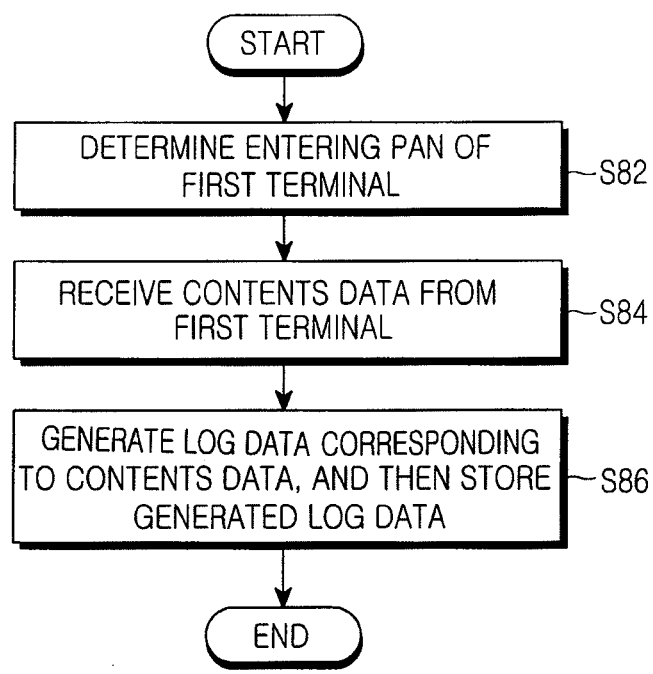
FIG. 6 is a flowchart illustrating a method for transmitting/receiving data by a second terminal among mobile communication terminals, each of which includes a Zigbee communication module according to an exemplary embodiment of the present invention.

FIG. 6 is a flowchart illustrating a method for transmitting/receiving data by a second terminal among mobile communication terminals, each of which includes a Zigbee communication module according to an exemplary embodiment of the present invention.

Referring to FIG. 6, the second terminal 14 determines that it has entered the PAN of the first terminal 10 in step S82. In that process, a Zigbee profile is set by the first terminal, and the second terminal 14 can perform a role of the Zigbee node of the first terminal 10. The second terminal 14 receives contents data from the first terminal 10 in step S84, generates log data corresponding to the received contents data, and then stores the generated log data in step S86.

The log data corresponding to information including information on the contents data, a reception time point at which the contents data is received, a position at which the contents data is received, etc., is generated by the control unit 34, and then can be stored in the memory 28. By storing the log data in the memory 28, even in a situation where subsequent contents data is deleted from the second terminal 14, a user can confirm information on contents data that has already been received.

Figure 7:
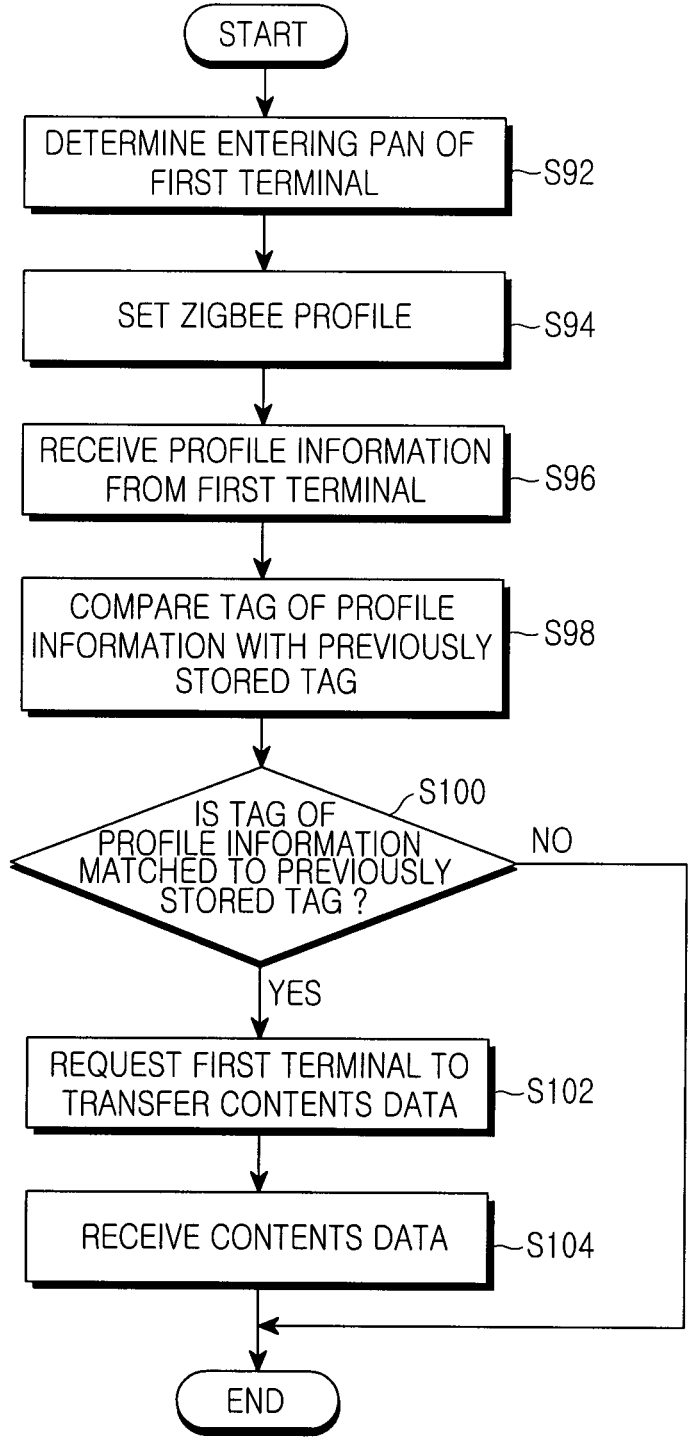
FIG. 7 is a flowchart illustrating a method for transmitting/receiving data by a second terminal among mobile communication terminals, each of which includes a Zigbee communication module according to another exemplary embodiment of the present invention.

FIG. 7 is a flowchart illustrating a method for transmitting/receiving data by a second terminal among mobile communication terminals, each of which includes a Zigbee communication module according to another exemplary embodiment of the present invention.

Referring to FIG. 7, the second terminal 14 determines that it has entered a PAN of a first terminal 10 in step S92, and then sets a Zigbee profile so as to perform a role of a Zigbee node of the first terminal 10 in step S94. The second terminal 14 receives the profile information from the first terminal 10 in step S96, and then compares a tag of the received profile information with a previously stored tag in step S98. According to a comparative result, a control unit of the second terminal 14 determines if the tag of the received profile information coincides with the previously stored tag in step S100.

If the tag of the received profile information coincides with the previously stored tag, the second terminal 14 requests the first terminal 10 to transfer contents data in step S102, and then receives the relevant contents data in step S104. In contrast, if the tag of the received profile information does not coincide with the previously stored tag, the second terminal 14 does not make a transfer request for receiving the contents data of the first terminal 10, and then completes an operation thereof.

Figure 8:
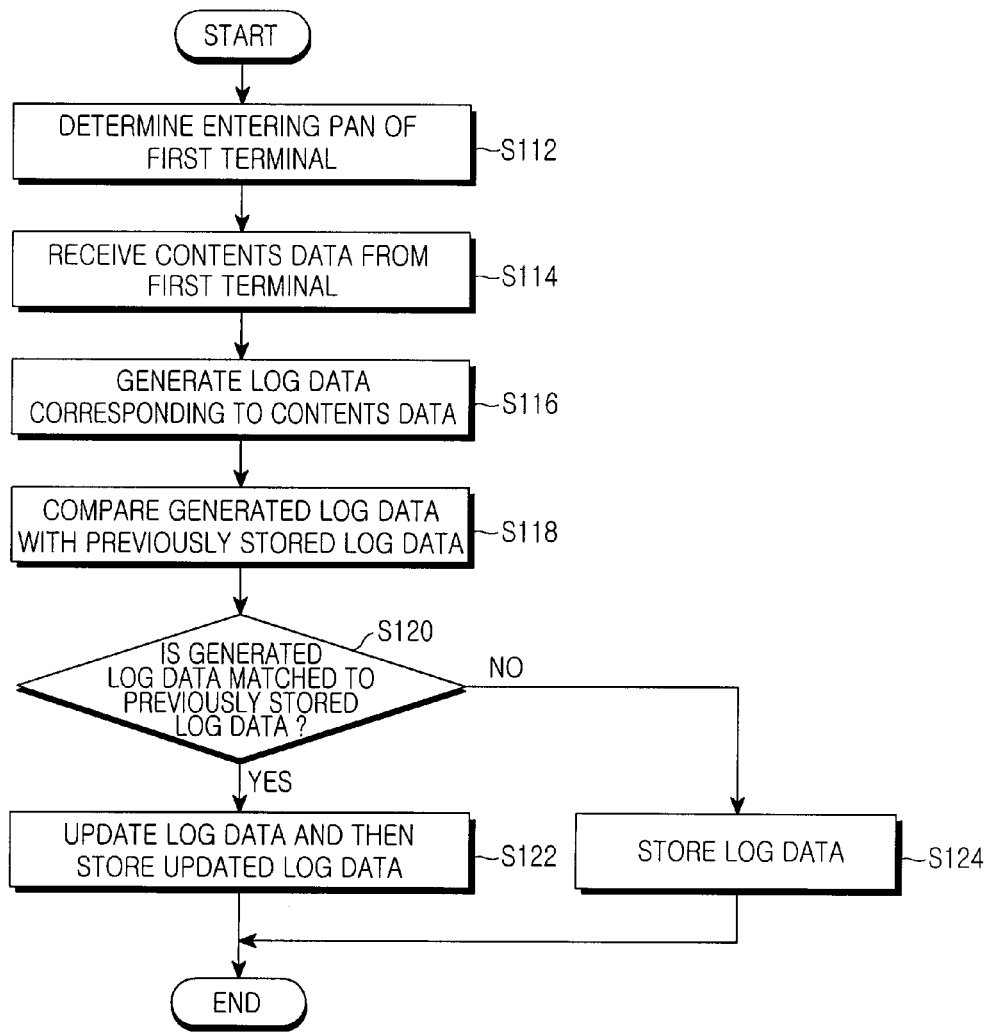
FIG. 8 is a flowchart illustrating a method for transmitting/receiving data by a second terminal among mobile communication terminals, each of which includes a Zigbee communication module according to another exemplary embodiment of the present invention.

FIG. 8 is a flowchart illustrating a method for transmitting/receiving data by a second terminal among mobile communication terminals, each of which includes a Zigbee communication module according to another exemplary embodiment of the present invention.

Referring to FIG. 8, the second terminal 14 determines that it has entered a PAN of a first terminal 10 in step S112, and then receives contents data from the first terminal 10 in step S114. The second terminal 14 generates log data corresponding to the received contents data in step S116. Then, the second terminal 14 compares the generated log data with previously stored log data in step S118, and then determines if the generated log data coincides with the previously stored log data in step S120.

Whether the generated log data coincides with the previously stored log data can be determined by comparing information on contents data, a reception position of contents data, etc. of the generated log data with those of the previously stored log data. If a tag of contents data, a reception position, an IP address of the first terminal 10, etc. of the generated log data coincide with those of the previously stored log data, the generated log data and the previously stored log data can be determined as coinciding with each other. The log data can correspond to data required to determine if contents data currently received by the second terminal 14 corresponds to previously received contents data.

If it is determined in step S120 that the generated log data coincides with the previously stored log data, the second terminal 14 updates the generated log data, and then stores updated log data in step S122. In contrast, if the generated log data does not coincide with the previously stored log data, the second terminal 14 enables a memory to store newly generated log data in step S124.

While it is not described in the exemplary embodiment of the present invention, the second terminal 14 enables a display unit 26 to display the coincidence between the generated log data and the previously stored log data if it is determined in step S120 that the generated log data coincides with the previously stored log data, and can then inform a user of the coincidence between the generated log data and the previously stored log data.

Figure 9A:
FIGS. 9A and 9B are views illustrating contents data transferred from a first terminal among mobile communication terminals, each of which includes a Zigbee communication module according to an exemplary embodiment of the present invention.
Figure 9B:

FIGS. 9A and 9B are views illustrating contents data transferred from a first terminal among mobile communication terminals, each of which includes a Zigbee communication module according to an exemplary embodiment of the present invention.

FIG. 9A depicts a mobile discount coupon that a user advertises for a commercial purpose. The user can broadcast a commercial advertisement as illustrated in FIG. 9A in the PAN of the first terminal 10 by using the first terminal 10 including the Zigbee communication module 32. The discount coupon depicted in FIG. 9A is expressed as text, and corresponds to one of discount coupons of miscellaneous fashion goods, such as shoes, bags, and the like.

FIG. 9B depicts an electronic business card that a user who utilizes a mobile communication terminal including the Zigbee communication module 32 can transfer to another user's mobile communication terminal in a business meeting, and the like. The user of the first terminal 10 may transfer profile information including a tag, such as "electronic business card", in the PAN, and then broadcast the electronic business card, such as shown in FIG. 9B, to a mobile communication terminal included in the PAN. As in the case of the electronic business card illustrated in FIG. 9B, contents data can include characters or numerals as well as images.

At this time, since a PAN can be produced by any mobile communication terminal equipped with the Zigbee communication module, a number of mobile communication terminals, each of which can perform the role of the Zigbee coordinator within a specific zone, can be equal to one or more. Hence, when the electronic business card illustrated in FIG. 9B is to be transferred in a conference room, the electronic business cards can be exchanged by users.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents. Especially, in the above-described exemplary embodiments of the present invention, while contents data corresponds to an advertisement or an electronic business card, those embodiments are given only for the sake of convenience so as to facilitate a description of the present invention. Therefore, in the case of a mobile communication terminal equipped with a Zigbee module, by those skilled in the art, the above method for transmitting/receiving data can be applied to all data which can be transmitted/received in a PAN.

What is claimed is:

1. A terminal, comprising:
   a communication interface configured to perform short-distance communication; and
   a processor configured to:
      receive first profile information and first contents data,
      generate log data based on the received first profile information and first contents data,
      determine if the generated log data and previously stored log data coincide with each other or not,
      update the previously stored log data if the generated log data and the previously stored log data coincide with each other, and
      store the updated log data.

2. The terminal as claimed in claim 1,
   wherein the communication interface is further configured to generate a personal area network (PAN), and
   wherein the processor is further configured to control the communication interface to broadcast the first profile information and the first content data in the PAN.

3. The terminal as claimed in claim 1, wherein the processor is further configured to generate the first contents data according to an input received from a user.

4. The terminal as claimed in claim 1, wherein the first contents data corresponds to at least one of an advertisement, a guidance, multimedia data and a text message.

5. The terminal as claimed in claim 1, wherein the first profile information comprises at least one tag extracted from the first contents data, and the first tag corresponds to at least one of a character and an image included in the first contents data.

6. The terminal as claimed in claim 1,
   wherein the communication interface is further configured to receive second profile information broadcasted from one or more second electronic devices,
   wherein a context engine extracts one or more second tags from the second profile information, and
   wherein the processor is further configured to:
      determine whether the one or more second tags and previously stored tag coincide with each other or not, and
      control the communication interface to receive second contents data corresponding to the one or more second tags if the one or more second tags and previously stored tag coincide with each other.

7. The as claimed in claim 1, wherein,
   if the generated log data and previously stored log data coincide with each other, the processor is further configured to inform a user that the generated log data and the previously stored log data coincide with each other.

8. The terminal as claimed in claim 1, further comprising:
   a display configured to display the second content data from the one or more second electronic devices.

9. A method for transmitting/receiving data at a terminal, the method comprising:
   receiving first profile information and first contents data;
   generating log data to be used based on the received first profile information and first contents data;
   determining if the generated log data and previously stored log data coincide with each other or not;
   updating the previously stored log data if the generated log data and the previously stored log data coincide with each other; and
   storing the updated log data.

10. The method as claimed in claim 9, before generation of the first contents data, further comprising generating a personal area network (PAN),
    wherein the first contents data and the first profile information is broadcast in the PAN.

11. The method as claimed in claim 9, wherein the first contents data corresponds to at least one of an advertisement, a guidance, multimedia data and a text message.

12. The method as claimed in claim 9, wherein the first profile information comprises at least one tag extracted from the first contents data, and the tag corresponds to at least one of a character and an image included in first the contents data.

13. The method as claimed in claim 9, further comprising:
    receiving second profile information broadcasted from one or more electronic devices;
    extracting one or more second tags from the second profile information;
    determining whether the one or more second tags and previously stored tag coincide with each other or not; and if the one or more second tags and previously stored tag coincide with each other, receiving second contents data corresponding to the one or more second tags.

14. The method as claimed in claim 9, further comprising:
if the generated log data and previously stored log data coincide with each other, informing a user that the generated log data and the previously stored log data coincide with each other.

15. The method as claimed in claim 9, further comprising:
displaying the second content data from the one or more electronic devices.

\* \* \* \* \*